United States Patent [19]

Melzi et al.

[11] Patent Number: 4,588,010

[45] Date of Patent: May 13, 1986

[54] ANTI-SKID DEVICE FOR MOTOR VEHICLE TIRES

[75] Inventors: Carlo Melzi; Paolo Gregorutti, both of Tarvisio, Italy

[73] Assignee: Acciaierie Weissenfels S.p.A., Tarvisio, Italy

[21] Appl. No.: 577,860

[22] Filed: Feb. 7, 1984

[30] Foreign Application Priority Data

Feb. 14, 1983 [DE] Fed. Rep. of Germany ....... 3305073
May 20, 1983 [DE] Fed. Rep. of Germany ....... 3318551
Dec. 28, 1983 [DE] Fed. Rep. of Germany ... 8337510[U]

[51] Int. Cl.$^4$ .................... B60C 27/10; B60C 27/06
[52] U.S. Cl. .................... 152/213 A; 24/303; 152/217; 152/242; 403/344
[58] Field of Search .............. 152/213 R, 213 A, 216, 152/217, 218, 231, 239, 240, 241, 242, 208, 220, 172, 177, 179, 184, 191, 225 R, 225 C, 219; 403/344; 81/15.8; 24/303, 241 PS, 189, 192, 199, 200, 662, 68 CT, 69 TT, 70 TT; 292/213, 216, 235, 125, 225; 267/154, 155, 58

[56] References Cited

U.S. PATENT DOCUMENTS

| | | | |
|---|---|---|---|
| 1,059,182 | 4/1913 | Martin | 152/242 |
| 1,511,685 | 10/1924 | Spiro | 152/217 |
| 1,745,273 | 1/1930 | Romain | 152/242 X |
| 1,801,159 | 4/1931 | Hunger | 152/242 X |
| 2,176,631 | 10/1939 | Kunkle | 152/241 |
| 2,363,998 | 11/1944 | Royer | 152/213 A |
| 2,493,263 | 1/1950 | Prehn | 152/241 X |
| 2,594,068 | 4/1952 | Pike | 152/242 |
| 2,639,753 | 5/1953 | Pike | 152/242 |

FOREIGN PATENT DOCUMENTS

2556115 6/1977 Fed. Rep. of Germany.
3137309 4/1982 Fed. Rep. of Germany.
3225318 6/1984 Fed. Rep. of Germany.

Primary Examiner—Edward Kimlin
Assistant Examiner—Thomas Bokan

[57] ABSTRACT

An anti-skid device for motor vehicle tires is provided including front and rear holding devices, which lie against the inside and outside of the tire when the chain is mounted, and between which chain strand sections extend over the running surface of the tire. One of the holding devices which usually is the rear holding device in the mounted state, is essentially circular and has a rigid middle section and two rigid side sections, one end of each of which is attached by pivotal connections to an end of the middle section in such a way that it can be pivoted. Pretensioned spring devices are provided at the pivot connections to bias the side sections toward each other in the mounted condition after the rear holding device is passed over the tire with the side sections pivoted outwardly. Locking devices for securing the two ends of the side sections together in the mounted position are also provided.

42 Claims, 12 Drawing Figures

ANTI-SKID DEVICE FOR MOTOR VEHICLE TIRES

FIELD OF THE INVENTION

This invention broadly relates to anti-skid devices for motor vehicle tires and more particularly to a tire chain assembly including front and rear holding devices, which respectively lie against the outside and inside of the tire when the chain is mounted. The tire chain assembly has chain strand sections, extending over the tread of the tire. At least one of the holding devices, usually the rear holding device in the mounted state, is essentially circular and has a rigid middle section as well as two rigid side sections. The side sections are pivotally attached at one end to the ends of the middle section in a manner such that, when mounting the tire chain assembly on the tire, the device can be opened up in order to pass over the tire by rotating the side sections radially towards the outside with respect to the middle section.

The main problem with anti-skid devices such as snow chains for motor vehicle tires is mounting the chains. It should be possible to do this quickly and, as far as possible, without moving the vehicle.

BACKGROUND OF THE INVENTION

Snow chains have recently become known, in which the rear holding device consists of a spring steel bracket, which is circular, but not closed. In order to mount this spring-steel bracket on a tire the bracket can be grasped by the operator with both hands and easily extended in diameter until it can be passed quickly over the tire to the inner side of the tire. The open ends of the spring-steel bracket are bridged by means of a tension chain, which is attached to one end of the bracket and passed through a ring at the other. The free end of the tension chain, after being passed through the guide ring, is passed over the running surface of the tire in such a way that it remains on the outer side of the tire, even while the chain is being mounted. Should the spring-steel bracket slip out of position on the inner side of the tire, a vigorous pull is applied to the free end of the tension strand on the outside and, by so doing, the rear holding device; i.e. the spring-steel bracket, is again seated tightly. In order to complete the mounting of this previously known anti-skid chain, it is necessary, after slipping the spring-steel bracket over the tire and giving the tension strand an initial tightening, to move the vehicle backwards or forwards by a small distance, since only after so doing does it become possible to tighten the tension strand to achieve the desired seating of the rear holding device. This is because the tension strand bridging the two ends of the rear holding device is passed through the guide ring before the holding device is slipped over the vehicle tire. Consequently, it is unnecessary to thread the tension strands into the ring after slipping the spring-steel bracket over the inner side of the tire. However, after the chain is put on, the wheel must be turned to finally tighten the rear holding device.

An anti-skid device is also known in which the rear holding device consists of three, individual, rigid sections instead of a spring-steel bracket (German Offenlengungsschrift No. 2,020,452, FIG. 15). When mounting this three part anti-skid device, the two rigid side sections, which are movably connected to the two ends of the middle section, are swivelled to move them apart so the holding device can be slipped over the tire. Subsequently, however, the operator must reach around the tire to its inner side in order to bring the ends of the side sections together by hand and attach them to each other by some suitable means. After this, the outer holding device must be tightened in a similar manner. This previously known construction enables the anti-skid device to be completely mounted, even when the vehicle tires are stuck, so that the final seating of the snow chains can be achieved without maneuvering the vehicle. The handling of such previously known snow chains while mounting is, however, very cumbersome and requires a certain amount of dexterity on the part of the operator. Furthermore, since the chains generally must be put on under unfavorable weather conditions, the operator also usually becomes quite dirty.

SUMMARY OF THE INVENTION

The principal object of the present invention is to improve an anti-skid chain of the above type such that, while the snow chain can be mounted without moving the wheel, even when the vehicle is stuck, an untrained operator can accomplish such mounting very quickly and simply.

This objective is accomplished in accordance with the invention by providing a holding device, usually a rear holding device, having two side sections hinged to a middle section wherein both side sections are pretensioned in the direction of a closed condition. Pretensioning of the holding device is effected by means of tensioning devices arranged at the respective hinge or pivotal joints between the sections. The side sections are also held under pretension in their final mounted position on the tire.

The anti-skid device of the invention is surprisingly easy to mount and completely uncomplicated in operation. To mount the device, the operator grasps both side sections of the holding device and pivots them radially relative to the middle section towards the outside until the holding device can be pushed over the running surface of the vehicle tire. The side sections are then released. As a result of the spring devices arranged at the pivotal joints or connections, the two side sections, after being released, automatically swivel or pivot into their final closed position and continue to be held under a predetermined tension in their final mounting position. The holding device in its closed condition provides a rigid construction ensuring good seating for the anti-skid device on the inner side of the vehicle tire. With the device of the invention the operator need not perform any tensioning operation at all with respect to the inner holding device, nor is it necessary to turn the wheel of the vehicle to the slightest extent. The snow chain of the invention is therefore particularly suitable for mounting on a vehicle which is completely stuck and therefore can no longer be maneuvered.

The simplified handling of the new anti-skid chain and the operator comfort in comparison to handling other known anti-skid devices is surprisingly great. In order to mount the anti-skid chain completely, it is only necessary to bend the side sections of the rear holding device somewhat apart, then to slip the rear holding device over the wheel and to release the side sections at the back, whereupon the rear holding device immediately springs into the desired final position. Thereafter, a side chain, which may be used, by way of example, as the outer holding device, is tightened briefly on the outer side. After these two operations the whole anti-skid device will have been seated in its final position.

In an advantageous improvement of the anti-skid device of the invention, provisions are made for pressing the free ends of the side sections together in close fitting contact when the rear holding device is in the closed form. If necessary, the two ends can be partially or completely interlocked by suitably shaping the free ends of the side sections. The swivel joints or pivot joints can be readily constructed in such manner that they guide the side sections so accurately that the ends of the side sections always meet as desired.

A further advantageous improvement of the anti-skid device of the invention involves the provision of an end pin at the free end of the one side section and a guide bushing at the free end of the other side section. In this improvement the end pin engages the guide bushing in the final, closed position of the holding device. Advantageously, the end pin is constructed essentially cylindrically and the guide bushing is constructed as a tubular part open towards the other side section and having an outer section, or border, enlarged conically towards the outer end. In this arrangement, the outer end of the end pin can have any suitable shape, to facilitate insertion into the guide bushing. The border of the guide bushing, which is enlarged conically towards the outer end, also ensures a centering action, if the end pin of the other side section is not completely centered as it approaches the bushing.

A further advantageous improvement of the anti-skid device of the invention involves the use of an outer and inner stop arranged in each pivot joint for limiting the motion of the hinged side sections relative to the middle section. As a result a maximum opening position as well as the greatest possible inward movement of the side sections are fixed.

A particularly simple and effective as well as inexpensive form of tensioning device for use in the swivel joints of the invention consists of a flat spiral spring. Such a spring arrangement is simple and requires very little space. The pretension of the flat spiral spring is advantageously adjustable from the outside of the inner holding device by use of a suitable device on the tension leg of the flat spiral spring on the inner portion of the spring. The pretensioning device turns the tension leg of the spring against the pretensioning direction of the spring. Particularly suitable for this purpose is a refinement in which the radial end of the flat spiral spring, which lies on the inside, engages a pivot pin which is attached to the middle section of the rear holding device and can be turned relative to the middle section and arrested in each position of rotation. An arrangement is provided to carry out these turning and arresting operations from the outside of the holding device. By such means, a relatively simple arrangement is provided for adjusting the spring tension without difficulty before the chain is mounted on the tire.

A further preferred development of the anti-skid device of the invention provides a leg, or angle, spring and/or a leaf spring as the tensioning device. In certain special cases however, it may also be advantageous to use other pretensioning devices or to provide combinations of different types of springs. For certain cases, it may also be advantageous to provide springs or spring combinations with a spring characteristic such that, for example, the spring force does not increase proportionally to the deflection path but instead the pretension increases only subproportionally starting from the closed position of the rear holding device. In such case, it is only necessary to make certain that, when the two side sections are released after the rear holding device is slipped over the vehicle tire, the desired, automatic and reliable snapping together of the two legs takes place and that the ends of these legs are also effectively pressed against each other in the closed state.

In a further advantageous improvement of the anti-skid device, locking elements are mounted at the free ends of the side sections. When the rear holding device is closed, these locking elements, through a mutual, positive engagement, lock the ends of the side sections together in order to provide a positive closure of the rear holding device if desired. For removing a chain assembly incorporating a rear holding device provided with such locking elements, it is necessary to provide a device by means of which the locking action can be disengaged prior to removing the chain assembly from the tire. Especially preferred for this is the provision of the rear holding device of means for unlocking the locking elements. The unlocking means can preferably be operated from the front holding device for simplicity of operation. Suitable means should, however, also be provided for preventing untimely unlocking.

The individual parts of the rear holding device can advantageously be produced from bent, flat, metal strip, or from bent, round, metal rods, or manufactured from some other suitable material. It is, however, also particularly advantageous, if the middle and side sections are formed from bent metal pipe. Moreover, the end region of the metal pipe of one side section is preferably provided with an expanding cross section within which a catch is arranged. Furthermore, at the end of the other side section, a projecting locking pin is provided which, when the inner holding device is closed, is introduced into the catch and locked in place. In addition, a tension strand is used as a device for unlocking. The tension strand is arranged within the pipe of the side section holding the catch and one end is passed near the swivel joint of this side section out of the pipe and to the front holding device, from where it can be operated. The other end of the tension strand is attached to the catch so that the catch opens when the tension strand is pulled. The catch is advantageously constructed in the form of a locking jaw, which is spring-pretensioned in the closed position and whose inner holding surface (mold face) is shaped to fit the shape of the end of the locking pin. A thin steel rope is preferably used as the tension strand. Equally preferable, however, are various other possibilities such as high-strength synthetic fiber strands or ropes.

An advantageous development of the anti-skid device of the invention incorporates a front holding device in the form of a side chain, which can be tensioned by means of a tension strand or chain. Equally preferably, however, the front holding device may have essentially the same construction as the rear holding device. In such an arrangement particularly rapid mounting of the chain assembly is possible, because it is then not even necessary to tighten an outer holding device in the form of a chain.

A further advantageous development of the invention also provides a permanent magnet at the end of one side section, which magnet provides an additional closing force in the locked position. It is, furthermore advantageous if the anti-skid device is constructed at least in the end regions of the side sections as a flat metal section and the end regions of both side sections lie laterally next to each other in the final assembled position and overlap. In this case, a permanent magnet can be fitted to one side section, which magnet laterally pulls together the free end regions of the two side sections where they partially overlap laterally in their final position. If provisions have been made for lateral overlapping of the end regions of the side sections, it is also of advantage to provide mutual locking elements on the side faces of the end regions of the side sections, which locking elements face each other in the final mounted position. For example, small openings can be provided in the end region of such a side section, which openings are engaged by a small projection of suitable shape arranged in the end region of the other side section.

The end regions of the side sections can, however, also advantageously be constructed so that the end of one side section is forked and, in the final closed position the end of the other side section protrudes between the two prongs of the fork.

A further preferred development of the anti-skid device of the invention provides end regions of the side sections and having a flat section which at its free end is bent hook-shaped in a direction away from the side of the tire and in its region outside of the hook-shaped bend is provided with an engagement opening, through which the hook-shaped bent end of the other side section of the holding device can grip in the final assembled position. A permanent magnet is once again preferably provided in the respective flat section of the end section in the region between the hook-shaped bend and the opening. This arrangement of the end regions of the side sections ensures a particularly rapid, and, so to speak "automatically" acting effective locking between the end sections on closing the holding device using very simply constructed and designed end sections on both side sections. When the rear holding device during the mounting operation on a tire is brought by means of the spring devices into the closed state after the two side sections are released, the two flat sections with their hook-shaped bends provided at the ends of the side sections, are pressed against each other. As a result, because the curvatures of the hooks oppose each other, the two side sections are deflected somewhat laterally with respect to each other and are then displaced in an overlapping relationship until the hook on one flat section slides along the back side of the other section and snaps into the opening. In this way a very good, automatic closing and locking of the whole holding device is achieved. In this connection, it is particularly advantageous if the flat section, in the region of its hook-shaped bend, has a width which decreases continuously in the direction of the end of the bend, as a result of which the insertion of the hook in the opening is particularly facilitated. The arrangement of permanent magnets in the ends of the flat sections ensures that, no matter how the two side sections come to lie next to each other, the two flat sections, when the side sections are hooked together, are held together by the permanent magnet of the section whose hook extends through the opening in the other section. Moreover, the strength of the permanent magnet can easily be selected so the interlocking action of the hook is effectively preserved but the magnets do not produce too great a resistance to deliberate disengagement.

A preferred variation of the anti-skid device includes end regions on the side sections having a flat section provided at its free longitudinal end with a laterally displaced, hook-shaped (preferably in the form of a round hook) bend, which is turned away from the side of the tire. A stop edge is provided on the flat section of the hook-shaped bend in a manner such that, on closing the holding device, the hook-shaped bend of the end region of one respective side section can be hooked onto the stop edge of the other side section. As in the previously described example of the operation, similar end pieces are attached to the two side sections to ensure that, when the side sections of the rear holding device are pressed together by the action of the spring devices, effective automatic interlocking of the ends of the two side sections is achieved. Owing to the fact that the two side sections are arranged as mirror images of each other (as they are also in the previous embodiment), the desired locking action occurs irrespective of which of the two end pieces (viewing the tire from the inside of the vehicle) comes to lie at the front and which at the rear. The curvature of the hooks contra to the interlocking motion ensures that, after the hook has engaged, any undesirable opening up of the two side sections while driving is completely prevented.

In the aforementioned embodiment, it is also very advantageous to install a permanent magnet in each end region of the flat section of the area between the hook-shaped bend and the stop edge. A magnet of larger area can be used with this embodiment, because there is no opening in the flat section. Advantageously, one end of the stop edge is bounded by the body of the flat section and the other end by a guide lug. Such arrangement provides lateral guidance of the hook-shaped bend of the other side section as this is being engaged with the stop edge ("lateral" is understood here to be lateral to the direction of motion). This embodiment for the ends of the side sections also forms an easily manufactured, uncomplicated, inexpensive and yet at the same time effective and reliable locking device for the side sections, which—like the aforementioned embodiment—in conjunction with the flexible construction of the rear holding device ensures simple operation, with great safety and good performance.

In a further preferred development of the inventive anti-skid device, an assembly handle is provided on each side section in such a manner that, when the wheel is turned with the anti-skid device attached to the tire, and the closed holding device is turning about its center, the free inertial forces, which arise when the holding device turns with the tire, are balanced. In this embodiment, the handles used not only facilitate handling the device while mounting or dismantling it, but also, through their arrangement and weight, balance the rear holding device and prevent undesirable displacement of such device caused by centrifugal force while the vehicle is being driven. Due to these precautions, the rotating rear holding device can be held firmly at the axis of the tire even while the wheel is turning rapidly.

It is, furthermore, advantageous to arrange the hook-shaped bends of both side sections of the rear holding device so that, as the holding device is closed, the convex sides of the hooks contact each other causing a lateral deflection during the interlocking motion, thereby allowing the two end sections to overlap so the hook of the one end section can engage the corresponding engagement means of the other end section.

It is furthermore advantageous to attach the flat sections to the corresponding side sections by rivets. A further, simple and very effective means of attachment, however, makes use of two lateral mounting shackles on the flat end sections, each lateral shackle being bent around the back side of the adjacent side section such that it extends through an indentation in the laterial edge of the end of the side section against the back of the side section, which back side faces the side flank of the tire. By these means, a secure, quickly appliable and simple attachment of the flat section to the corresponding end of the side section is achieved.

BRIEF DESCRIPTION OF THE DRAWINGS

The invention is explained in principle and by way of example in greater detail by means of the following drawings.

DESCRIPTION OF THE PREFERRED EMBODIMENTS

Figure 1:
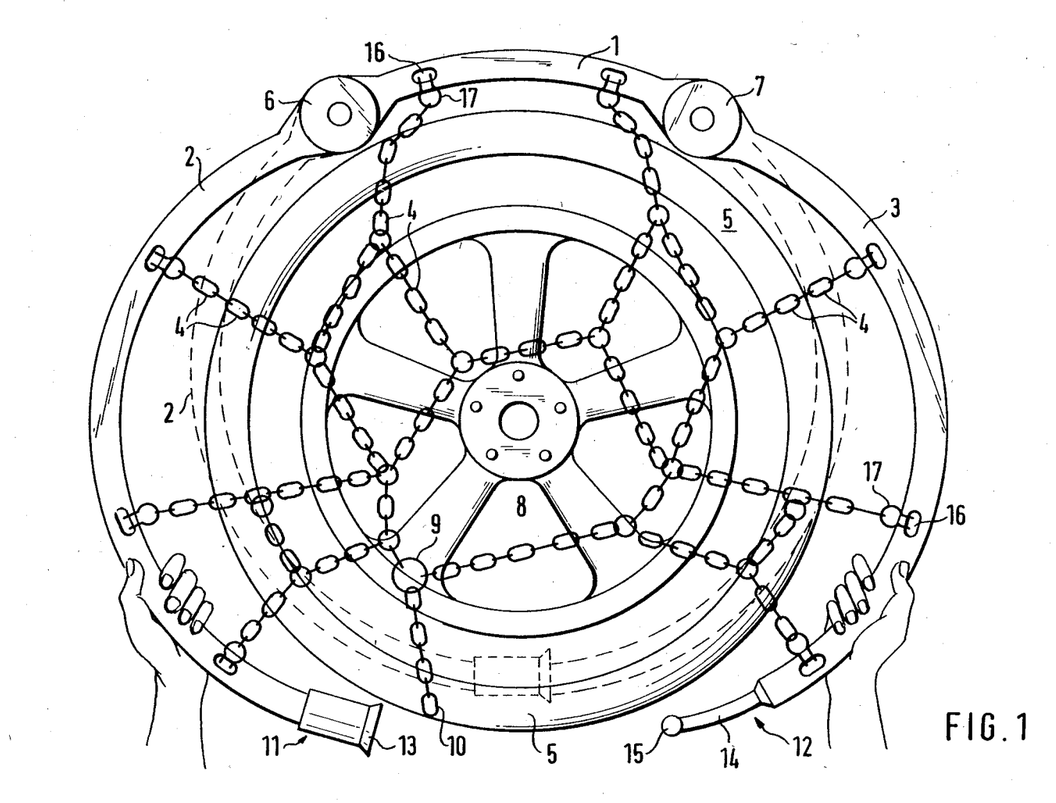
FIG. 1 is a view from the outer side of the tire of a vehicle showing the anti-skid device of the invention as it is passed over the running surface of the tire during mounting of the anti-skid device on the tire.

In FIG. 1, the anti-skid device of the invention is shown, including a rear holding device comprised of a rigid middle section 1 formed from bent flat steel together with rigid side sections 2 and 3 also formed from bent flat steel. Middle section 1 and side sections 2 and 3 are connected, by means of short chain strand sections 4, which, when the chain assembly is mounted on the vehicle tire 5, extend over the running surface of the tire, with an outer holding device in the form of a side chain 8, as shown. The outer side chain 8 includes an eye ring 9, to which is attached a tension strand or chain having a free end 10 which may be considered to be a free end of the side chain 8. In order to finally tighten the chain mounted on the tire, it is only necessary to pull firmly at the free end 10 of side chain 8 to insure a tight seating and the desired tension. After this final tightening of side chain 8, its free end 10 is attached through suitable hooks or other means of attachment (not shown in FIG. 1) at a suitable position on the side chain as known in the art. There is also the possibility of using a suitable stop, to prevent—irrespective of the attachment of the free end 10 of side chain 8—an unwanted reverse motion of the end 10 of chain 8 through ring 9 after the final tightening.

Side sections 2 and 3 are connected by means of pivot, or swivel, joints 6 and 7 with rigid middle section 1. At pivot joints 6 and 7, suitable springs (not shown in FIG. 1) are arranged, which springs pretension side sections 2 and 3 constantly in the closing direction, that is, in the direction of a circular, completely closed rear holding device. Such pretensioning springs may take the form of any suitable springs, for example, leg or angle type springs or leaf springs can be used. A particularly suitable type of spring, which can be used at the pivot joints 6 and 7 are flat spiral springs, such as shown in detail in FIG. 5. The use of such springs will be discussed below.

Figure 2:
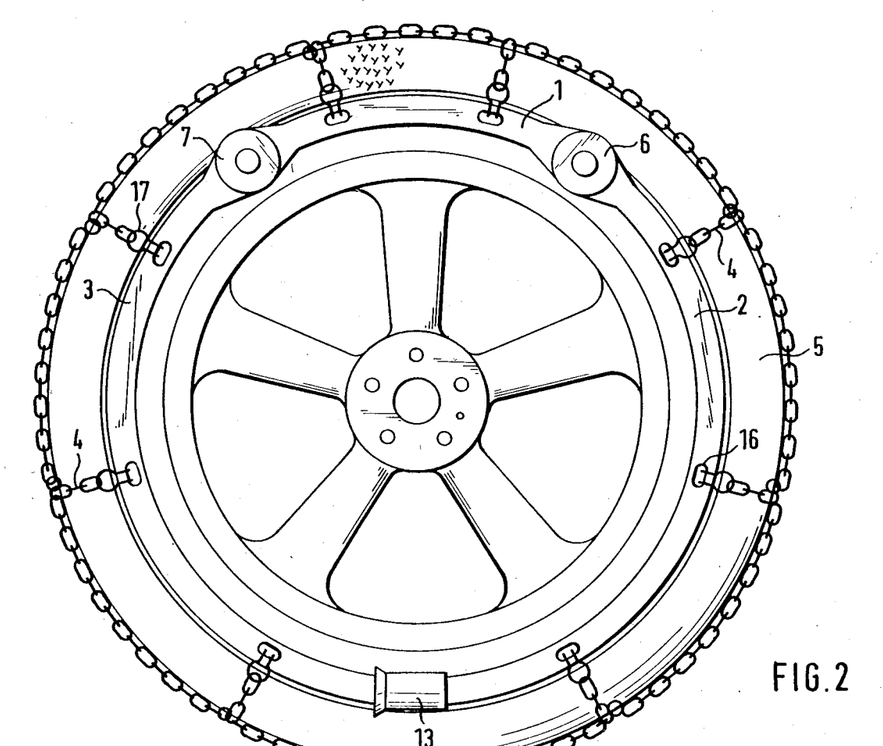
FIG. 2 shows a view of the anti-skid device of FIG. 1 viewed from the inner side of the tire in the final mounted position with the rear holding device closed.

For mounting the anti-skid device, the rear holding device is grasped with both hands in the lower region of the two side sections 2 and 3, as is shown in outline in FIG. 1, to which reference is specifically made. Side sections 2 and 3 are then opened or pivoted outwards against the action of the springs in the pivot joints 6 and 7 which are pretensioned even in the closed state, until the rear holding device can be easily slipped over the running surface of the tire on to the inner side of the tire. As soon as the rear holding device, consisting of sections 1, 2 and 3, has been slipped over the running surface of the tire on to the inner side of the tire, the operator can release both side sections 2 and 3. Through the action of the springs inserted in joints 6 and 7 the free ends of the two side sections 2 and 3 automatically close so that a closed form of the rear holding device results as the final mounted form. During this action the side sections swivel or pivot relative to middle section 1, as shown in FIG. 1 by the broken-line representation of side sections 2 and 3. As a result of the arrangement and geometry of chain strand sections 4, the rear holding device automatically adjusts so it is centered with respect to the tire, as can be seen in FIG. 2. FIG. 2 shows the rear holding device, as viewed from the vehicle side, in the final, closed, mounted position of the chain assembly after the operator has passed side sections 2 and 3 over the running surface of tire 5 and released them. The position of the rear holding device shown in FIG. 2 requires no further correction, so that only the free end 10 of side chain 8, which is either connected to or passed through ring 9, needs to be pulled tight on the front side of the tire in order to achieve a firm seating of the outer holding device on the outer side of the tire. After tightening of side chain 8 the free end 10 is then fastened by any suitable means in a known manner to side chain 8.

Openings 16 are provided in middle section 1 as well as in side sections 2 and 3, from which openings suitable fastenings or rings 17 are suspended. Chain strand sections 4 are in turn attached to the rings 17. Rings 17 are passed through openings 16 in such manner that the rings can swing around from the original mounting position, shown in FIG. 1 with the rings 17 aligned radially inwards, to the final mounting position, shown in FIG. 2 with the rings 17 aligned radially outwards. A large number of other possible arrangements are, of course, possible. It is even possible for rings 17 to have the same alignment in the original and final mounting positions. In this connection, any arrangement for attachment of the rings to the component parts of the rear holding device will be suitable, provided that it ensures the rings can swivel around, as required, during the chain mounting process. Various such attachment possibilities are known to those skilled in the art, so it is not necessary to go into details here.

It can be seen in FIG. 1 that a holding or guide bushing 13 is provided at the free end 11 of side section 2. The guide bushing is essentially constructed as a cylindrical, open section of pipe, the border or open end of which is enlarged in a generally conical form to the outside. At free end 12 of the other side section 3, a projecting end pin 14 is provided, which end pin 14 has on its one end a shaped part 15 that, when the rear holding device is closed, is received by the bushing 13 and guided by it to the final closed position. The length relationships between bushing 13 and end pin 14 as well as shaped part 15 are not drawn according to scale in FIG. 1. However, it will be recognized from FIG. 2 that the sizes are so designed that, in the closed state, the projecting end pin 14 together with formed part 15 is taken up completely in guide bush 13. The springs in pivot joints 6 and 7 are so pretensioned, moreover, that the free ends of side sections 2 and 3 continue to press against each other with some force even in the closed position of the rear holding device, so that side sections 2 and 3 support or engage with each other in some suitable arrangement in their rest position. This can be accomplished in various ways, for example, by supporting formed part 15 within bushing 13 against a suitable stop, which is provided in bushing 13 or at the free end of side section 2. However a locking device (not shown in FIGS. 1 and 2) perhaps in the form of a snap-on device, could also be provided within bushing 13. When shaped part 15 is introduced into bushing 13 and reaches the desired final position, this locking device could release a snap-on lock, so that side sections 2 and 3 are rigidly locked together and can no longer be opened by lateral movement, even by hand. In such case, however, a further device would have to be provided to ensure that the locking device could be opened rapidly for dismounting of the chain assembly from the tire. Practical trials have, however, shown that, even with nothing more than pretensioning of the springs in pivot joints 6 and 7, a sufficiently reliable closure of the rear holding device is assured at all speeds at which it is sensible to drive with snow chains.

Figure 3:
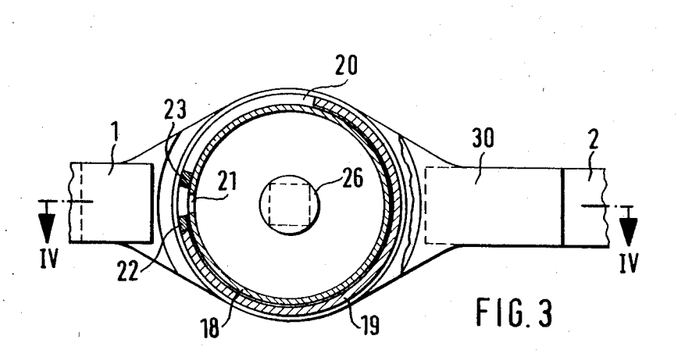
FIG. 3 shows a partially cut away representation of a pivot joint (with spring removed) of the holding device of the invention.
Figure 4:
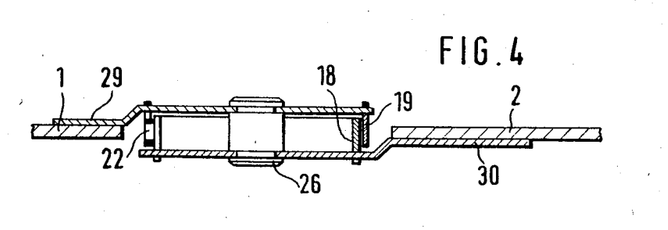
FIG. 4 shows a section along line IV—IV in FIG. 3.
Figure 5:
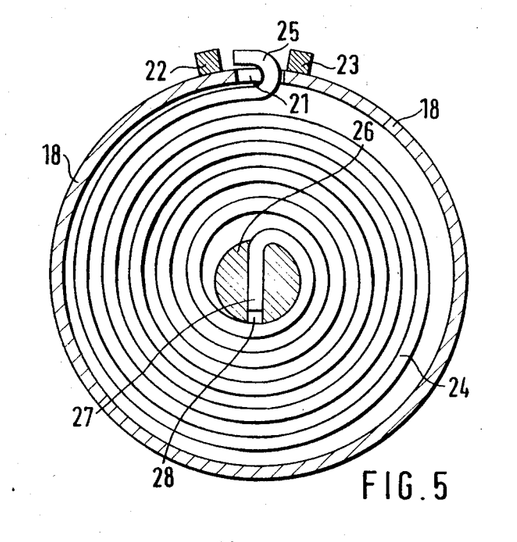
FIG. 5 shows a detailed representation of a flat spiral spring inserted in a swivel joint such as shown in FIG. 3 to serve as a pretensioning spring.

A more detailed representation of an embodiment of pivot joints 6 and 7 is given in FIGS. 3 to 5.

FIG. 3 schematically shows such a pivot joint positioned at its maximum extended position in which, for the sake of simplicity, the end portion of the middle section, as well as that of side section 2 are drawn in a straight line. As can be seen in the sectional representation of FIG. 4, a holding plate 29 on which a stay bolt 26 rests, is provided at the end of middle section 1. Stay bolt 26 is stationary relative to holding plate 29.

A supporting plate 30 seated rotatably on stay bolt 26 is attached to the end of side section 2. Supporting plate 30 is axially guided by stay bolt 26 as it is being rotated.

A round bushing 18 is attached to supporting plate 30 with its open side towards holding plate 29. See FIG. 4.

In the region radially bounded by the round bushing 18 and pin 26, a flat spiral spring 24 is arranged as shown in FIG. 5. The end 27 of the inner leg of spring 24 is inserted in a radial bore-hole 28 in pin 26. The bent outer leg 25 of flat spiral spring 24 protrudes through an opening or gap 21 in round bushing 18 to the outside of the bushing and is bent over there approximately in the manner shown in FIG. 5, whereby the shape ensures that spring end 25 cannot slip or press undesirably into the space within round bush 18. At the outer circumference of round bushing 18 moreover, on either side of opening 21, two stops 22 and 23 are arranged as end stops for the swivelling motion between side section 2 and middle section 1. These stops are connected in a suitable manner with round bushing 18.

A round bushing 19, constructed as a covering bushing, is also attached to holding plate 29 (see FIGS. 3 and 4) and encloses round bushing 18 on the outside and at a small radial distance therefrom. A recess 20, into which both stops 22 and 23, as well as end 25 of flat spiral spring 24 extend, is, however, provided in covering bushing 19. If a swivelling motion is now produced between middle section 1 and side section 2, a relative swivelling motion can then take place between supporting plate 30 and holding plate 29, until either stop 22 or stop 23 collides against the corresponding end of recess 20 in the covering bushing 19. With a bent-over end 25 of flat spiral spring 24 of suitable construction, it is also possible to do without stops 22 and 23, since end 25 projecting to the outside can itself be used as a suitable stop.

When side section 2 is pivoted or rotated relative to middle section 1, stay bolt 26, which is attached to holding plate 29, is rotated correspondingly relative to round bushing 18, which is attached to supporting plated 30, so that a corresponding pretension of flat spiral spring 24 is then produced. Flat spiral spring 24 is, however, also installed in the joint in question, so that in its initial position shown in FIG. 3 with stop 22 striking against round bush 19 there is already sufficient pretension in spring 24 that—in conjunction with pivoting of the other joint in the rear holding device—reliable closing of the rear holding device is assured during mounting and later operation. The attachment of pivot pin 26 to holding plate 29 can be quite rigid and immovable. It is, however, also possible to use a variable fixation device such that, with the joint completely assembled, the pivot pin can be rotated or twisted from the outside in order to adjust the pretension of flat spiral spring 24. When the desired pretension is reached, the pivot pin is fixed rigidly once again to holding plate 29.

The position of the flat spiral spring in FIG. 5 does not correspond to the position of the joint in FIG. 3, but rather to a position displaced by 90° towards the top.

Figure 6:
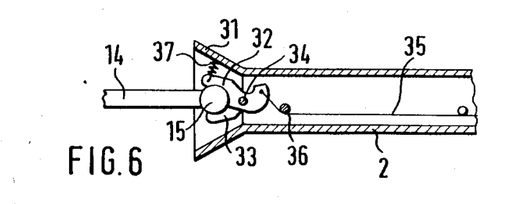
FIG. 6 shows a longitudinal cross sectional representation of the end of a side section formed of a circular aluminum tube, including a catch or locking device.

In the representations of FIGS. 1 to 4, middle section 1 and rear sections 2 and 3 are in each case constructed from bent, flat metal strip. However, the individual elements of the rear holding device can also be constructed readily from rod stock or from pipes. In FIG. 6, the end of a side section 2, made from a tubular material is shown as an example. The end region 31 of the side section 2 is enlarged conically. A catch is provided within the enlarged end region 31 and has an upper pawl arm 32 and a lower pawl arm 33, both of which are supported on a pawl pivot 34. Moreover, as in the case shown, the lower pawl arm 33 can be mounted in a fixed position, while the upper pawl arm 32 can be swivelled about pin 34. The upper pawl arm 32 is pretensioned in the direction of its closing position with a schematically illustrated spring 37.

The operation of the catch arrangement shown in FIG. 6 is as follows. On pressing side sections 2 and 3 together, end pin 14, projecting from the end of one side section is urged together with its formed part 15 toward the end of the other side section, until formed part 15 is introduced completely into the appropriately shaped seating opening of the catch formed between the pawl arms 33 and 32. In the final closed position, formed part 15 is completely taken up within the catch formed by the pawl arms 33 and 32 and any unwanted withdrawing of the part is positively prevented by the pawl arms. Moreover, spring 37 ensures that mobile pawl arm 32, with its internal formed surface, is also pressed against formed part 15. The upper pawl arm 32 is extended beyond its pivot 34 and bent upwards in a suitable manner. Attached to an extension of upper pawl arm 32 is a tension strand 35 in the form of a suitable, thin steel rope, which is passed from the point of suspension first of all over a guide pin 36, provided within the pipe, and from there, is passed on within the pipe body of side section 2. At a different location (not shown in FIG. 6) in pipe 2, which location preferably lies near the corresponding pivot 6, tension strand 35 is led in a suitable form from pipe body 2 and then, supported by suitable holding devices at chains 4, passed on further to side chain 8 in such a manner that, when the rear holding device is placed in position, the free end of the tension strand is always within the region of side chain 8, and therefore remains on the outside of the wheel. From there, the locking effect of the pawl can be released by pulling at the free end of tension strand 35 and the rear holding device can easily then be opened or dismantled. In order to match the guidance of tension strand 35 to the curvature of the side section, within which it runs, it is preferred to provide along the side section several guide pins 36 which guide and support tension strand 35 so that a tangential approximation of the curved shape of the side section is attained. It is also possible to provide small, freely rotatable guide wheels on the guide pins, in order to facilitate longitudinal movement of tension strand 35. In practical trials, however, it has been found that the arrangement of small guide pins, possibly provided with a Teflon layer, is completely adequate for the satisfactory operation of the mechanism.

The arrangement of the first guide pin 36 relative to the point of suspension of tension strand 35 at the rear section of the upper pawl arm 32 should be such that tension strand 35 is guided between guide pin 36 and the point of attachment at the upper pawl arm 32 in a direction which runs approximately perpendicularly to a line passing through pawl pivot pin 34 and the point of attachment of tension strand 35 at the extended rear section of the upper pawl arm 32, so that in each case, when the tension strand 35 is pulled, the greatest possible leverage is made available to the tensile force at its point of action on the upper pawl arm 32, in order to ensure that the catch can be opened easily.

Shaped part 15 at the end of the projecting end pin 14 is shown in the Figures, by way of example, only as a body with a circular cross section. In order to achieve the best possible latching effect, it is entirely possible to use other shapes for the shaped element, for example, shaped bodies with a triangular, conical or semicircular cross section or with some other suitable shape.

An additionally, very advantageous embodiment of the rear holding device of the invention, not specifically shown in the Figures, which may be used in the case in which the open ends of side sections 2 and 3 are pressed together in the closed state (that is, pressed against each other without a catch), comprises a permanent magnet inserted into the end of one side section while the end of the other side section consists of a suitable magnetizable material. In this embodiment the magnetic forces provide an additional closing force in the closed state. If a sufficiently strong magnetic closing force is used, the pretension of the springs in swivel joints 6 and 7 can be relatively low in the closed position of the holding device, since the force of attraction, exerted by the magnet, largely prevents any unwanted opening of the rear holding device.

Preferably, middle section 1 of the rear holding device is constructed so that it extends from the center of joint 6 to the center of joint 7 over an arc of between 60° and 90°.

The spring devices in pivot joints 6 and 7 can also advantageously be so designed that the operating forces, required for spreading side sections 2 and 3 apart, do not increase proportionally to the increased spreading, but increase rather at a far lower rate. A desired, characteristic spring curve can be achieved, for example, by connecting together more than one spring (or type of spring), by varying the thickness of the effective spring leg over the length of the leg, or by other suitable measures with which those skilled in the art are familiar. For certain applications, it may also be advantageous to provide, for example, notches in the swivel joints in the positions where side sections 2 and 3 are fully spread out. In this case, spread-out side sections 2 and 3 would click into position in the position of maximum spread, so that the holding device can then be slipped over the wheel 5 of the vehicle without the application of any spreading force by the operator. In that case, however, suitable devices (perhaps in the form of pressure pins, small lever switches, etc.) may be required in order to enable side sections 2 and 3 to be disengaged when the rear holding device reaches the inner side of the wheel, whereupon, as already described, the side sections then spring into their final mounted position under the action of the spring pretension in pivot joints 6 and 7. A single release device can even be provided, possibly on middle section 1, through which said locked positions are cancelled simultaneously on both pivot joints 6 and 7.

Figure 7:
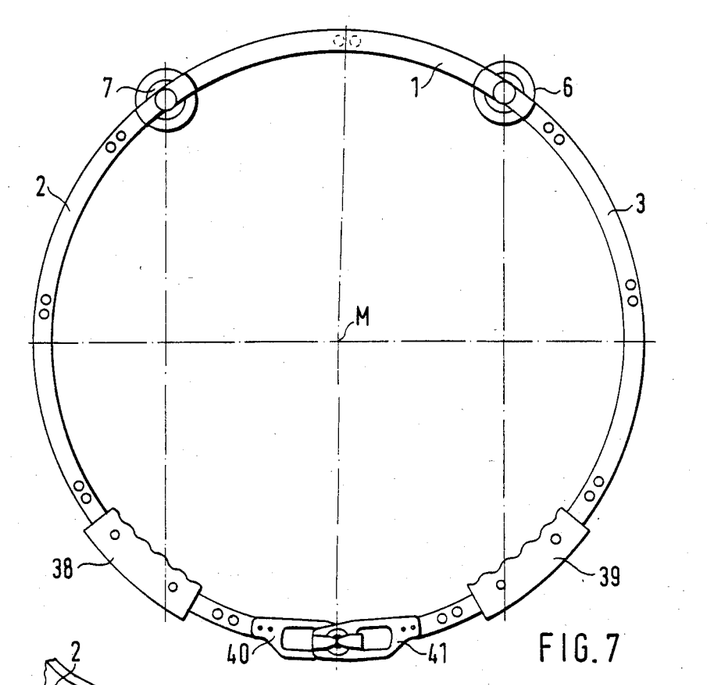
FIG. 7 shows a further embodiment of the rear holding device of the invention (seen from the inner side of the tire), in the closed state.

FIG. 7 shows a further embodiment of a rear holding device for the anti-skid device of the invention in plan view looking at the inner side of the tire. In order to simplify the representation, however, the tire contours as well as the anti-skid chains have been omitted and only the rear holding device itself is shown (viewed in the same direction as in FIG. 2). As in the embodiment shown in FIGS. 1 and 2, a middle section 1 of bent, flat steel, to which two side sections 2 and 3 are hinged by way of pivot joints 6 and 7, is used. These side sections 2 and 3 are also produced from bent flat steel. Handles 38 and 39 are provided on side sections 2 and 3 at a slight distance from the ends. They consist preferably of a suitable plastic and not only considerably simplify the handling of the anti-skid device by the operator during assembly, but are moreover so selected in respect to their position and weight, that the holding device, when in the same closed form as shown in FIG. 7, is balanced in respect to its free inertial forces relative to its center of rotation M. Since such free inertial forces can be initiated by the weight of pivot joints 6 and 7, in the practical case handles 38 and 39 must be arranged in respect to their position as well as their mass essentially to balance the masses of pivot joints 6 and 7. In the embodiment of a holding device shown in FIG. 7, the position of handles 38 and 39 is therefore approximately the mirror image in respect to the center of rotation M of the position of pivot joints 6 and 7 on the other side.

In the holding device of FIG. 7, end pieces in the form of flat end sections 40 and 41 are used at the ends of rigid side sections 2 and 3. The more precise function and development of the flat end sections are shown in greater detail in FIGS. 8 and 9.

Figure 8:
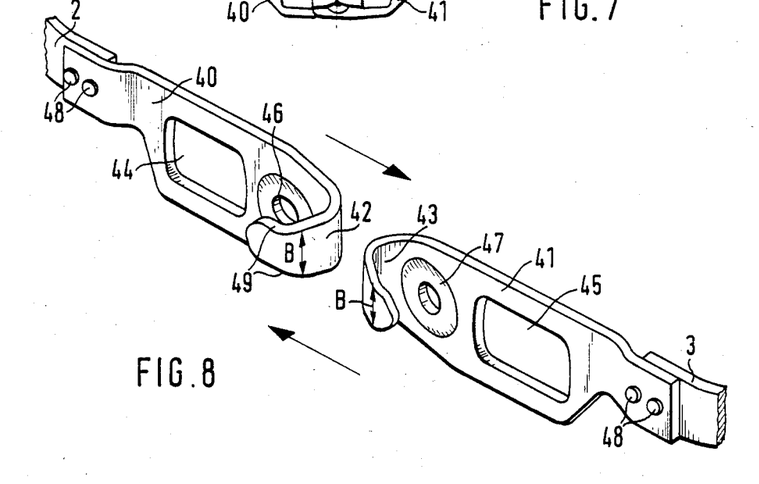
FIG. 8 is a detail representation of the end pieces or fastening means on the side sections, used in the rear holding device of FIG. 7, shown in the act of closing, but not yet in the closed position.

FIG. 8 shows on an enlarged scale how, on closing the holding device shown in FIG. 7, the two flat end sections 40 and 41 approach each other (as indicated by two arrows at the side, pointing in opposite directions) during the closing motion. In FIG. 8 the end sections are shown shortly before the closed position is reached, while the closed position, also shown in FIG. 7, is shown in FIG. 9.

Figures 9, 10:
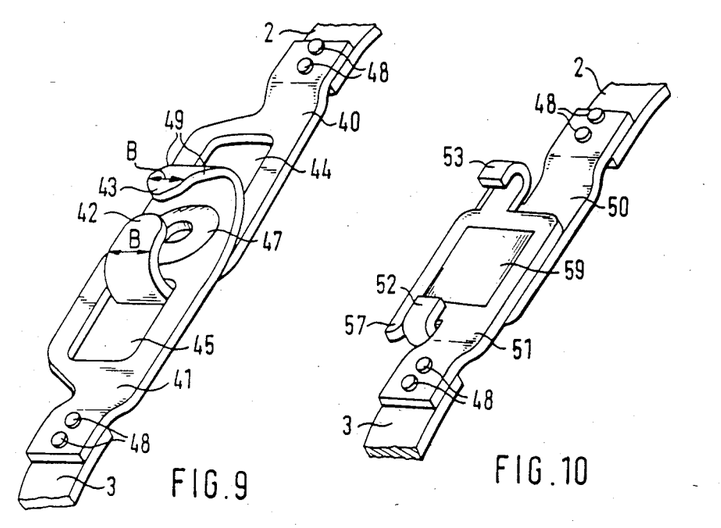
FIG. 9 and FIG. 10 are representations of two embodiments of end pieces or fastening means on the side sections of the holding device of the invention shown in fastened position.

The two end sections 40 and 41 are, as can be seen in FIGS. 8 and 9, made from a flat material. The lateral dimensions of the end sections 40 and 41 increase to one side a short distance beyond the point where the end sections are connected to respective side sections 2 and 3 by rivets 48 or other suitable fastenings. There are openings 44 and 45, in the increased dimension, laterally extended portions of end sections 40 and 41 of the corresponding side sections 2 or 3, as is shown in detail in FIG. 8 or FIG. 9.

The respective free ends of flat end sections 40 or 41 are bent in a hook-shape, which can be seen in greater detail in FIG. 8 or FIG. 9, the hook-shaped bends 42 and 43 being formed in each case on the side which is turned away from the side flank of the tire on which the corresponding holding device is arranged. As can also be seen clearly in FIGS. 8 and 9, side edges 49 converge in the region of hook-shaped bends 42 and 43 from the start of the bend to its end, so that width B (see FIGS. 8 and 9), in the region of hook-shaped bends 42 and 43, decreases continuously from the start of the bend to its end.

In their respective middle region, that is, in the region between the attachment to the corresponding side section 2 or 3 on the one hand and the hook-shaped bend 42 or 43 on the other, the flat end sections 40 and 41, as indicated above, are provided with an engagement means in the form of an opening 44 or 45, which, however, lies outside of the portion of the flat end pieces formed into the corresponding hook-shaped bends 42 or 43. In the region between the respective openings 44 or 45 and the hook-shaped bends 42 or 43, a permanent magnet 46 or 47 is arranged on the respective flat end section 40 or 41 on the side on which the corresponding end hook 42 or 43 is formed. The attachment of such a permanent magnet 46 or 47 can be effected in various ways. It has, however, proven to be particularly advantageous to glue the respective permanent magnets 46 or 47 by means of a suitable adhesive into a corresponding holding opening within the respective end sections 40 or 41. In addition to the particularly suitable round shape of such permanent magnets as shown in FIG. 8, any other suitable external form of magnet can also be used.

During closing of the rear holding device the two end sections 40 and 41, attached to the ends of side sections 2 and 3, are moved toward each other in the manner indicated in FIG. 8, the rounded end surfaces of the hook-shaped bends 42 and 43 ultimately colliding against each other. Under the pressure of the closing forces from pivot joints 6 and 7, this collision of the hook-shaped bends 42 and 43 against each other results in a lateral deflection of the two end sections 40 and 41 in such manner that one of the two end sections is deflected laterally in the direction of the outer side of the tire, while the other end section essentially continues along its closing path.

As soon as the deflected end section nearest the tire; i.e. looking in the direction of the side flank of the tire, the end section on the inside, has reached opening 44 or 45 in the other end section as the closing motion continues, the hook-shaped bend of the end section on the inside snaps into this opening 44 or 45 of the other end section, the closing position then having been reached. The permanent magnet of the end section, whose hook-shaped bend snaps into the opening of the other end section, ensures that the two end sections 40 and 41 will lie laterally sufficiently closely against each other so that any unwanted slipping out of the engaged hook from the opening is reliably prevented. Should forces arise now which might, as the tire of the vehicle is turned, be able to move the holding device apart in the opening direction, an unwanted opening of the holding device is reliably avoided by the engaged hook, which prevents movement of the holding device in the opening direction.

By arranging the two end sections 40 and 41 in such a way that they are shaped and arranged approximately as mirror images to each other, assurance is provided—irrespective of which section is laterally deflected during closing—that the final closed position (final mounting position) is reliably attained. The strength of the permanent magnets used can be selected so that the two end sections 40 and 41 always lie securely and laterally against each other in the closed position, without having to employ separating forces, which are too large and inconvenient when the corresponding holding device must be opened and removed by the operator.

The described decrease in width of the respective end section 40 or 41 in the region of the hook-shaped bends 42 and 43, facilitate the snapping of the respective hooks into opening 44 or 45 in the other end section.

The closed position of such a holding device is shown in FIG. 9. It would, of course also be possible to fashion the hook-shaped bends, not round and hook-shaped as shown in FIGS. 8 or 9, but with a curve such that the two hook-shaped bends, which collide as the holding device is closed, force an outward, lateral deflection of a particular one of the two end sections 40 or 41. The arrangement, shown in the Figures, has, however, the great advantage that it is left undecided which of the two end hooks will be deflected laterally outwards, so that each of the two end sections is in a position to assume the snapping-in function, no matter which of the two should be deflected to the outside (as seen from the flank of the tire) on closing.

Figure 11:
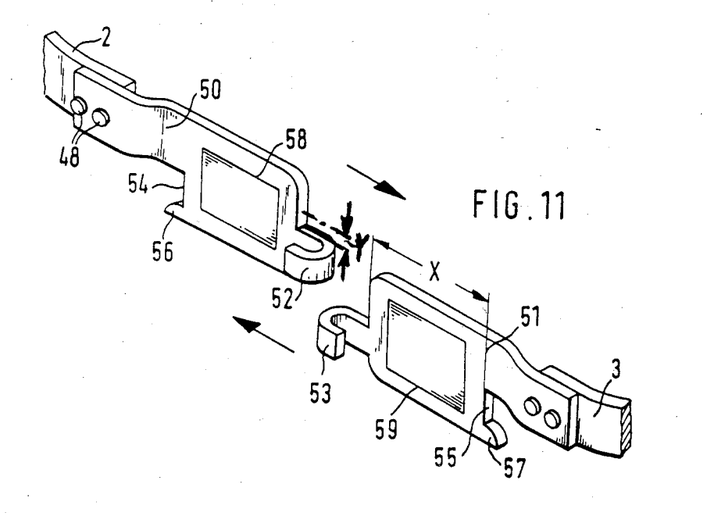
FIG. 11 shows a detailed representation of the end parts, shown in FIG. 10, during the closing motion (not quite in the closed state), in a position similar to that of FIG. 8.

A different embodiment for effective interlocking end sections is shown in FIGS. 10 and 11, FIG. 10 showing the final, closed position and FIG. 11 (corresponding to the representation of FIG. 8) showing an intermediate position of these end sections shortly before the final interlocked position is reached. The motion of the two end sections is indicated by arrows in FIG. 11.

In the embodiment shown in FIGS. 10 and 11, flat end sections, or supporting bodies, 50, 51 are used, one end of which is attached by rivets 48 to the end portions of the corresponding side sections 2 or 3. As can readily be seen in FIG. 11, the end portion of the flat end sections 50 or 51 which is to be attached to the corresponding side sections 2 or 3, is provided with a small lateral deflection in such manner that the main section of the flat end section 50 or 51 in question lies approximately along an extension of the longitudinal axis of the corresponding side section 2 or 3.

In its middle region, flat end sections 50 or 51 are laterally extended or widened and, within this area a large permanent magnet 58 or 59 is embedded on the side away from the side of the tire. At the free end of the flat end sections 50 or 51, a hook-shaped bend 52 or 53, turned away from the side of the tire, is once again provided. This bend does not extend over the whole width of the corresponding flat section 52 or 53, but is displaced by a distance Y laterally from a longitudinal center line of the holding device (see FIG. 11 where the longitudinal center line is indicated by dots and dashes and the lateral displacement of the hooked shaped bend is, as seen from the center of rotation M of the holding device as a whole—see FIG. 7—displaced radially towards the outside, as indicated by a solid line in FIG. 11). Beginning at approximately the longitudinal center line and in approximately the same lateral position to the center line as the corresponding hook-shaped bend 52 or 53, there is provided an engagement means in the form of a stop edge 54 or 55. This stop edge extends vertically to the longitudinal center line and is arranged at a distance X from the front edge of flat section 50 or 51, from which the hook-shaped bend 52 or 53 starts, in a direction opposite to the closing direction of the holding device, as can be seen in FIG. 11. Stop edge 54 or 55 is, as far as its length is concerned, bounded as shown in FIG. 11 towards the top, that is, in the direction of the center of rotation M of the holding device as a whole, by the projecting end section provided for attaching the flat end section 50 or 51 to the corresponding side section 2 or 3, and at its other end by projecting lugs 56 or 57. The projecting lugs 56 or 57 extend in the opening direction of the rear holding device, opposite to the direction of the hooks 52 and 53.

As shown in FIG. 11 by arrows, the two flat end sections 50 and 51 move towards each other, as the holding device is closed. Once again, an approximately mirror image arrangement of the two end sections 50 and 51 is selected, as can be seen from FIG. 11. The two hook-shaped bends 52 and 53 collide against each other with their round outer surfaces. One of the two flat end sections 50 and 51 (as seen from the side flank of the tire) is then deflected towards the outside during further closing motion, while the hook-shaped bend of the other of the two end sections runs along the back side of the firstmentioned section and then, on reaching stop edge 54 or 55, hooks against such stop edge. A closing position results as shown in FIG. 10. The permanent magnet of the flat end section 50 (FIG. 10), whose hook-shaped bend 52 is hooked against the stop edge of the other flat end section, ensures that the two middle sections of the flat end sections 50 and 51 lie securely against each other. The lug-shaped projection 57 ensures a certain lateral guidance for the hook-shaped bend 52, so that the latter can reliably collide against the stop edge and hook against it. The shape of the lug-like sections 56 and 57 is moreover selected so that a concerted lateral guidance of the attaching hook bends 52 or 53 in the direction of the stop edge can take place without unsteadiness. End sections 50 and 51, in the form shown in FIGS. 10 and 11, have a larger surface available for mounting the magnets 58 and 59, than do the embodiments shown in FIGS. 8 and 9. This is because with the design of end sections 50 and 51 shown in FIGS. 10 and 11 incorporating stop edges, there is no need to provide openings within the middle section of the flat end sections.

Figure 12:
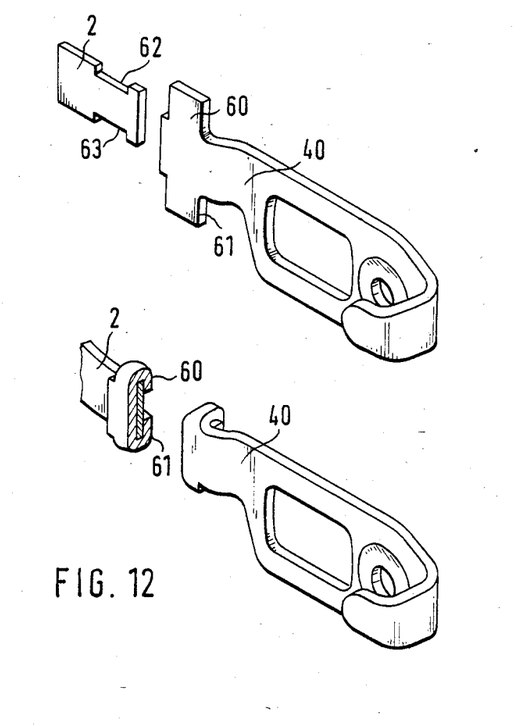
FIG. 12 is a two step representation of an example of the operation for assembling the end pieces, or fastening means, shown in FIGS. 7 to 9 to the end of the corresponding side section of the rear holding device wherein the upper drawing shows the end piece before attachment and the lower drawing shows the end piece attached. A partial cross section is provided through the attachment area.

Finally, in FIG. 12, there is shown an attachment arrangement for the end pieces to the side sections which does not require the use of rivets and is both simple and reliable.

The upper view in FIG. 12 shows a modified embodiment of an end section 40 including an attachment means, and the corresponding side section 2 in the attachment region before the attachment is carried out. The lower view in FIG. 12 shows the attachment means at the end of the attachment operation including a sectional representation through the attachment region.

In the flat end section 40, shown in FIG. 12 in the end region provided for attachment to the corresponding side section 2, two lateral shackles 60 and 61 are provided which, in the unattached position, extend beyond the side edges of the end region of side section 2. As can be seen in FIG. 12, groove-shaped identations or recesses 62 and 63, corresponding in width and position to the lateral shackles 60 and 61, are provided in the side edges of the end regions of side section 2, specific reference once again being made to the pictorial representation in FIG. 12. For purpose of attachment, end section 40 is placed laterally against the end of the corresponding side section 2, so that the end section in question, as seen from the side flank of the tire, lies on the outside. The lateral shackles 60 and 61 are then brought into alignment with indentations 62 and 63 and bent through these indentations to the back side of side section 2, so that the lateral shackles protrude through the corresponding indentations 62 and 63 and come to lie against the back side of the side section. This position is shown in the lower representation of FIG. 12, a cross sectional representation through the attachment region being shown in order to better illustrate the construction. In this manner, a simple and yet reliable attachment of an end section to the corresponding side section can be achieved, any unwanted loosening of end section 40 from side section 2 being reliably prevented by the positive engagement between lateral shackles 60 and 61 and indentations 62 and 63. Should it ever prove necessary to exchange such an end section for another, the removal and replacement of such an end section is possible without great difficulty, because shackles 60 and 61 can be bent open at any time, even in the attached state, for removing end section 40.

What we claim is:

1. An anti-skid device for a motor vehicle tire comprising front and rear holding devices disposed, when mounted on a tire, against the outside and inside of the tire, respectively, at least the rear of said holding devices being comprised, prior to assembly of the anti-skid device, of at most three pre-assembled sections including a middle and two side sections, each side section being pivotally linked by pin means to said middle section in overlapping extensions of said middle and side sections to permit radial outward movement of the side sections relative to said middle section thereby to open the rear holding device to enable passing thereof in its pre-assembled form over the tire, said middle and two side sections being rigid and essentially of circular form when said at least rear holding device is mounted on the tire, said front and rear holding devices having attached thereto cross chains extending over the running surface of the tire, and pretensioned spring means fixedly directly attached to said pin means, forming part of the pre-assembled rear holding device, at each pivotal link to said rigid middle section for rotationally urging said rigid side sections radially inwardly relative to said rigid middle section into closed circular form after passing said at least rear holding device over the tire and holding said two rigid side sections and said rigid middle section under pretension in its closed fixed circular form.

2. An anti-skid device as defined in claim 1, wherein an inner and an outer stop are provided at each pivotal link for limiting the motion of the side sections relative to the middle section.

3. An anti-skid device as defined in claim 1, wherein the spring means for the pivotal links is a flat spiral spring one end of which is attached to the middle section and the other end of which is attached to a side section.

4. An anti-skid device as defined in claim 3, wherein the pretension of the flat spiral spring is adjustable from the outside of the at least rear holding device.

5. An anti-skid device as defined in claim 4, wherein a radial inside end of the flat spiral spring engages the pin means, comprising a pivot pin, which is fastened to the middle section and can be rotated relative to the middle section and arrested in each position of rotation, the rotation and arresting being adjustable from the outside of the holding device.

6. An anti-skid device as defined in claim 1, wherein a leg spring is used as a pretensioning spring means for at least one pivotal link.

7. An anti-skid device as defined in claim 1, wherein a leaf spring is used as a pretensioning spring means for at least one pivotal link.

8. An anti-skid device as defined in claim 1, wherein a projecting end pin is provided at the free end of a side section and a guide bushing at the free end of the other side section, the end pin engaging the guide bushing when the rear holding device is in its tire mounted position.

9. An anti-skid device as defined in claim 8, wherein the end pin is essentially cylindrical and the guide bushing is constructed from a tubular section open in the direction of the other side section, with a border, which enlarges conically towards the outside in the region of the opening.

10. An anti-skid device as defined in claim 1, wherein locking elements are mounted at the free ends of the side sections which, when the rear holding device is closed, fasten together the ends of the side sections through mutual positive engagement.

11. An anti-skid device as defined in claim 10, wherein a tension means, which can be operated from the front holding device, is provided at the rear holding device for fastening the locking elements during a mounting operation.

12. An anti-skid device as defined in claim 1, wherein the middle section and side sections of the rear holding device are formed from bent, flat metal strip.

13. An anti-skid device as defined in claim 1, wherein the middle section and side sections of the rear holding device are formed from bent round metal rods.

14. An anti-skid device as defined in claim 1, wherein the middle section and side sections of the rear holding device are formed from bent metal pipe.

15. An anti-skid device as defined in claim 14, wherein the metal pipe of a side section has a cross section which enlarges in the end region and within which a catch means is arranged, and from the end of the other side section a locking pin projects which, when the rear holding device is closed, is introduced into the catch and is locked in place by such means, and wherein a device for unlocking is provided comprising a tension strand arranged within the pipe of the side section, one end of which tension strand being passed near pivot links of this side section with the middle section out of the pipe and to the front holding device from where it can be operated, the other end being attached to the catch means in such a way, that the catch opens up when the tension strand is tensioned.

16. An anti-skid device as defined in claim 15, wherein the catch means is constructed in the form of a locking claw which is spring-pretensioned in the closed position.

17. An anti-skid device as defined in claim 16, wherein a thin steel rope is provided as the tension strand.

18. An anti-skid device as defined in claim 1, wherein the front holding device is constructed in the form of a side chain, which can be stressed by means of a tension strand.

19. An anti-skid device as defined in claim 1, wherein the front holding device has essentially the same construction as the rear holding device.

20. An anti-skid device as defined in claim 1, wherein a permanent magnet is provided at one end of a side section.

21. An anti-skid device as defined in claim 1, in which at least the end regions of the side sections are constructed as flat metal sections and wherein the end regions of both side sections overlap side by side in the final, assembled position.

22. An anti-skid device as defined in claim 21, wherein mutual locking elements are provided on the side faces of the end regions of the side sections, which sides face one another in the final, assembled position.

23. An anti-skid device as defined in claim 1, wherein the one end of a side section is forked and the end of the other side section protrudes between the two prongs in the final, assembled position.

24. An anti-skid device as defined in claim 1, wherein end regions of the side sections have a flat section which at its one end is bent hook-shaped in a direction away from the side of the tire and in its region outside of the hook-shaped bend is provided with an opening, through which the hook-shaped end of the other side section of the holding device can grasp in the final assembled position and wherein a permanent magnet is mounted in the respective flat section in the region between the hook-shaped bend and the opening.

25. An anti-skid device as defined in claim 24, wherein the flat section, in the region of its hook-shaped bend, has a width, which decreases continuously toward the bent end.

26. An anti-skid device as defined in claim 1, wherein the end regions of the side sections have a flat section which is provided at its free end with a laterally displaced, hook-shaped bend which turns away from the side of the tire, a stop edge being provided on the flat section at a distance from the hook-shaped bend and in the same lateral position as such bend in such a manner that, on closing the holding device, the hook-shaped bend of the end region of the respective other side section can be hooked into the stop edge.

27. An anti-skid device as defined in claim 26, wherein a permanent magnet is mounted in each end region in the flat section in the region between the hook-shaped bend and the stop edge.

28. An anti-skid device as defined in claim 26, wherein the stop edge is bounded at its one end by a portion of the flat section and at its other end by a guide lug, by means of which the hook-shaped bend of the other side section is guided laterally as it is being hooked in.

29. An anti-skid device as defined in claim 1, wherein an assembly handle is provided on each side section in such a way that when the closed rear holding device is turned about its center of rotation in the mounted position the free inertial forces are balanced.

30. An anti-skid device as defined in claim 24, wherein the hook-shaped bends of both side sections are so arranged that, as the rear holding device is closed, the hook-shaped bends collide against one another with their convex curves, which face each other.

31. An anti-skid device as defined in claim 24, wherein the flat section is attached to the corresponding side section by rivets.

32. An anti-skid device as defined in claim 24, wherein the flat section is fastened by means of two lateral mounting shackles to the corresponding side section such that each lateral shackle is bent so as to extend through an identation provided at the end of the side section in the side edge of such side section and which is additionally bent so as to lie against the back side section which faces the side flank of the tire.

33. In an anti-skid chain for motor vehicle tires, a locking means for an expandable chain mounting device constructed in the form of an inherently stiff ring that can be expanded by opening outwardly for mounting, the locking means comprising two supporting bodies, each of which is attached to one end of the chain mounting device, an engagement means provided on one supporting body and acting as a point of engagement for a locking element provided on the other supporting body, and wherein each supporting body is provided with an engagement means as well as with a locking element, the engagement means and the locking elements being arranged on the two supporting bodies as mirror images of each other, the locking elements being provided on mutually facing ends of the supporting bodies and extending away from the side surface of the tire as hooks bent against the opening direction of the chain mounting device, and wherein the mutually facing end regions of the two supporting bodies laterally overlap each other in the engaged position.

34. A lock as defined in claim 33, wherein both supporting bodies essentially have a mirror-image shape in the mounted state.

35. A lock as defined in claim 33, wherein each supporting body has a laterally extended section which, at its end facing the other supporting body, is bent in hook-shaped fashion and in its region outside of the hook-shaped bend is provided with an engagement means in the form of an opening through which the hook-shaped, bent end of the other supporting body grips in the engaged position.

36. A lock as defined in claim 35, wherein a permanent magnet is mounted in the laterally extended section of each supporting body in the region between the hook-shaped bend and the opening.

37. A lock as defined in claim 36, wherein the width of the laterally extended section in the region of its hook-shaped bend decreases continuously in the direction of the end of the bend.

38. A lock as defined in claim 33, wherein each supporting body has a flat end section, which is provided at its free end with a laterally offset, hook-shaped bend directed away from the side of the tire, and an engagement means in the form of a stop edge provided on the flat end section at a distance from the hook-shaped bend and in the same lateral position as this bend in such a way that, when the lock is closed, the hook-shaped bend of the end region of the other side section can be hooked into this stop edge.

39. A lock as defined in claim 38, wherein a permanent magnet is mounted at each end region in the flat end section in the region between the hook-shaped bend and the stop edge.

40. A lock as defined in claim 38, wherein the stop edge is bounded at its one end by the flat end section and at its other by a guide lug, as a result of which a lateral guidance is developed for the hook-shaped bend of the other side section as it is being engaged with the stop edge.

41. A lock as defined in claim 33, wherein the bent hooks or the hook-shaped bends on both supporting bodies are so arranged, that they collide against each other with their mutually facing, convex surfaces during a closing-locking motion.

42. An anti-skid device for a motor vehicle tire rotatable about a predetermined axis, comprising front and rear holding devices disposed, when mounted on a tire, against the outside and inside of the tire respectfully, at least the rear of the said holding devices being comprised, prior to mounting on the tire, of at most three pre-assembled sections including a middle and two side sections each side section being pivotally linked by pin means to said middle section in overlapping extensions of said middle and side sections to permit movement of said side sections relative to said middle section about axes parallel to said predetermined axis, said middle and two side sections being essentially of circular form when said at least one of said holding devices is mounted on the tire in its pre-assembled form, said front and rear holding devices having attached thereto a chain extending over the running surface of the tire, and at most two pretensioned spring means fixedly directly attached to said pin means, forming part of the preassembled sections, at each pivotal link to said middle section for pretensioning said side sections into circular form after mounting of said at least one of said holding devices on the tire and holding said holding device in pretension, each said spring means comprising a spiral spring one end of which is attached to the middle section and the other end of which is attached to a side section.

* * * * *